United States Patent [19]
Quadakkers et al.

[11] Patent Number: 5,733,682
[45] Date of Patent: Mar. 31, 1998

[54] METALLIC BIPOLAR PLATE FOR HIGH-TEMPERATURE FUEL CELLS AND METHOD OF MAKING SAME

[75] Inventors: Willem Quadakkers, Wijnandsrade, Netherlands; Ferdinand Baumanns, Alsdorf; Hubertus Nickel, Jülich, both of Germany

[73] Assignee: Forschungszentrum Julich GmbH, Julich, Germany

[21] Appl. No.: 716,211

[22] PCT Filed: Mar. 25, 1995

[86] PCT No.: PCT/DE95/00432

§ 371 Date: Sep. 17, 1996

§ 102(e) Date: Sep. 17, 1996

[87] PCT Pub. No.: WO95/26576

PCT Pub. Date: Oct. 5, 1995

[30] Foreign Application Priority Data

Mar. 28, 1994 [DE] Germany ............. 44 10 711.0

[51] Int. Cl.[6] .................................. H01M 8/02
[52] U.S. Cl. .............................. 429/210; 429/34
[58] Field of Search ........................ 429/210, 34

[56] References Cited

FOREIGN PATENT DOCUMENTS 0 423 448  4/1991  European Pat. Off. .
0 424 732  5/1991  European Pat. Off. .

OTHER PUBLICATIONS

Patent Abstract of Japan, vol. 11, No. 382 (E-564), 12 Dec. 1987 & JP A 62 147 663 (Matsushita Elec. Ind. Co. Ltd.).
Patent Abstract of Japan, vol. 9, No. 61 (E-303), 19 Mar. 1985 & JP A 59 201371 (Kogyo Gijutsuin et al) 14 Nov. 1984.

Primary Examiner—John S. Maples
Attorney, Agent, or Firm—Herbert Dubno

[57] ABSTRACT

A metallic bipolar plate for a high-temperature fuel cell, the plate being a metal body having surfaces adapted to contact electrodes of the fuel cell and passages having walls confining gases, including fuel and oxidizing gases, for the fuel cell, the body being composed of a chromium-containing alloy oxidizable at the surfaces to form chromium oxide at interfaces between the bipolar plate and the electrodes, the alloy being enriched with aluminum at least in regions of the walls in direct contact with the gases.

10 Claims, 2 Drawing Sheets

METALLIC BIPOLAR PLATE FOR HIGH-TEMPERATURE FUEL CELLS AND METHOD OF MAKING SAME

CROSS REFERENCE TO RELATED APPLICATIONS

This application is a national stage of PCT/DE 95/00432 filed 25 Mar. 1995 and based, in turn, on German National application P 44 10 711.0 filed 28 Mar. 1994.

FIELD OF THE INVENTION

The invention relates to a metallic bipolar plate for a high-temperature fuel cell.

BACKGROUND OF THE INVENTION

High-temperature fuel cells (solid oxide fuel cells—SOFC) offer the possibility of direct conversion of chemical into electrical energy. The fuel ($H_2$, $CH_4$, CO, etc.) is separated from the oxidation medium ($O_2$, air) by an oxygen-conducting solid electrolyte (Y-stabilized $ZrO_2$). At the operating temperature of the cell (approximately 950° C.) oxygen ions are transported from the cathode side through the electrolyte and react at the anode side with the fuel. Because of charge balance, an electron current flows in the same direction.

For increasing the rates of the described reactions, the electrolyte must be coated with porous catalytically-active electrode materials. In general, the anode or fuel side is provided with an Ni/$ZrO_2$-Cermet while the cathode or oxygen side is provided with a LaMn-Perovskite.

The voltage which can be obtained from a single cell is low (<1V). For utilizing SOFC technology for power generation, a large number of cells must be connected together. For this purpose, a further cell component is required, namely the bipolar plate or interconnector. By contrast with the electrolyte and the electrodes, which are generally around 100 μm thick, the bipolar plate of an SOFC is several millimeters thick and in the common designs is not only the gas feeding, and connecting part between the individual cells, but also the load carrying component of the cell (see for example EP 0 338 823 A1).

At the preferred operating temperatures (T approximately 950° C.), the bipolar plate must therefore have the following properties:

1. Sufficient mechanical strength;
2. Gas tightness;
3. Simple (inexpensive) fabricatability;
4. Electrode material thermal expansion similar to that of the ceramic;
5. Good electrical conductivity;
6. Corrosion resistance as to the fuel (e.g. $H_2O/H_2$) and to the oxidizing gas (e.g. air); and
7. Compatibility with the electrode materials.

Presently, two groups of materials are being discussed as bipolar plate material, namely, $LaCrO_3$-based systems and metallic high-temperature materials. The latter have been favored more recently because of their better ductility, better electrical conductivity and easier fabrication. Because of the aforementioned hot gas corrosion resistance which is required, only $Al_2O_3$-forming and $Cr_2O_3$-forming high temperature alloys are potentially suitable. NiCr-based or NiCrAl-based alloys are, however, unsuitable because of their high thermal expansion coefficients ($\approx 20 \cdot 10^{-6} k^{-1}$ as compared with $\approx 10 \cdot 10^{-6} k^{-1}$ for electrolyte/electrodes) in accordance with present day understandings.

For the present SOFC concepts, mainly two types of potentially suitable alloys are under consideration:

1. FeCrAl-(ODS-) alloys (typical composition in weight % 20Cr, 5Al, 0.5$Y_2O_3$, balance Fe) which form $Al_2O_3$ surface layers at the service temperature.

2. Cr-based (ODS)-alloys (typical composition in weight %: 5Fe, 1$Y_2O_3$ balance Cr) which upon high temperature use form $Cr_2O_3$ surface layers.

The alloy compositions (1) have a superior resistance to corrosion because of the corrosion-limiting characteristics of the $Al_2O_3$ surface layers forming during high temperature service. However, in SOFCs this alloy layer causes problems due to an increase of the interfacial contact resistance between the bipolar plate and the electrode.

The alloys (2) have the significant advantage of a low thermal expansion coefficient but tend to show oxide scale spallation due to the relatively rapid formation of thick $Cr_2O_3$ layers. The scale spallation detrimentally affects the gas flow in the gas passages during long-term operation.

DE 42 42 570 A1 describes a mixture of CrNi alloy and 50 to 85 weight % (in terms of the mixture) of oxide ceramic used with a "binding material" for said oxide fuel cells, the oxide ceramic consisting especially of silicon oxide or aluminum oxide to adjust the thermal expansion coefficients. Details of components of this system and their possible uses as bipolar plates, are not described.

OBJECT OF THE INVENTION

The object of the invention therefore is a bipolar plate for high-temperature fuel cells which, possesses a significant corrosion resistance and a thermal expansion matching that of the ceramic cell component, and also does not cause problems with respect to contact with the electrode nor with hampering of gas flow.

SUMMARY OF THE INVENTION

The bipolar plate developed according to the invention for this purpose consists of a chromium-oxide-forming alloy with an aluminum-enriched surface layer in the regions of the interconnector which are in contact with the gas.

The bipolar plate can have a layered thickness of the aluminum-enriched surface layer of 20 to 200 μm, preferably 50 to 100 μm. The regions which are in direct contact with the surface gases can have surface contours comprised of channels with gas-containing channel inner surfaces while the electrode or electrodes contact rib surfaces. These rib surfaces tend to form the chromium oxide. The metal body may be composed of chromium-nickel or chromium-iron alloys and a preferred chromium based alloy (composition in weight %) is CR-5FE-1$Y_2O_3$ or a ferritic steel containing 20 to 35 weight % chromium. In the process for producing a bipolar plate, a surface of the prefabricated bipolar body is enriched with aluminum and thereafter a portion of the aluminum enriched layer is removed from the contact surface serving for interconnection with the electrodes. The surface can be enriched by aluminizing and the heights of the ribs can initially be fabricated to be higher than finally desired and the ribs can be ground down to the final height. From experiments with bipolar plate materials, it has been established that at the usual operating temperatures of high-temperature fuel cells, chromiumoxide layers form on chromium alloys which, at the elevated temperatures (approximately 950° C.) have a sufficient electrical conductivity that at the transition between bipolar plate and electrode, no current flow problems arise.

Through the use of a chromium-oxide-forming alloy for the bipolar plate, especially good mechanical properties are achieved with respect to the reduced thermal expansion of the material and a problem-free contact with the electrodes. The aluminum enrichment applied according to the invention at the surfaces of the gas-contacting regions of the invention (especially internal surfaces of the gas passages), assures that in these places a protective, slowly growing $Al_2O_3$ scale is formed whereas at the contact areas between interconnector and the electrodes, the highly conductive chromia scales are formed.

The bipolar plate materials can be chromium, nickel-chromium, iron-chromium, or chromium, nickel alloys whereby especially chromium-iron alloys are preferred. The aluminum enriched layer should have a thickness between 20 and 200 μm, especially 50 to 100 μm.

BRIEF DESCRIPTION OF THE DRAWING

The above and other objects, features, and advantages will become more readily apparent from the following description, reference being made to the accompanying drawing in which.

SPECIFIC DESCRIPTION

Figure 3:
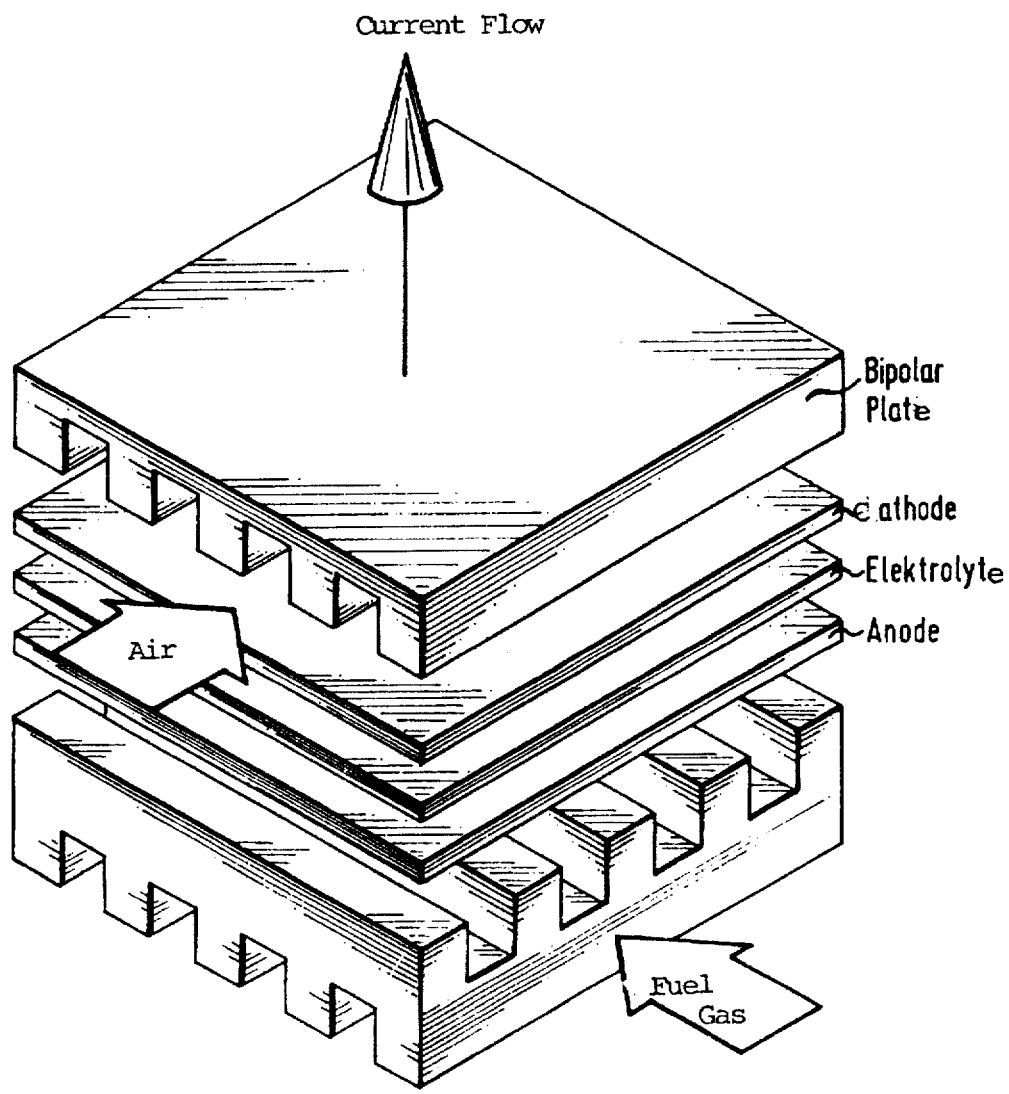
FIG. 3 is a perspective view showing a stacking sequence of bipolar plates with electrodes and solid electrolyte arranged between them.

The diagram shown in FIG. 3 corresponds to a fuel cell of known type with a cell stack which, for clarity, has been illustrated in exploded form an having a bipolar plate of the invention.

Figure 1:
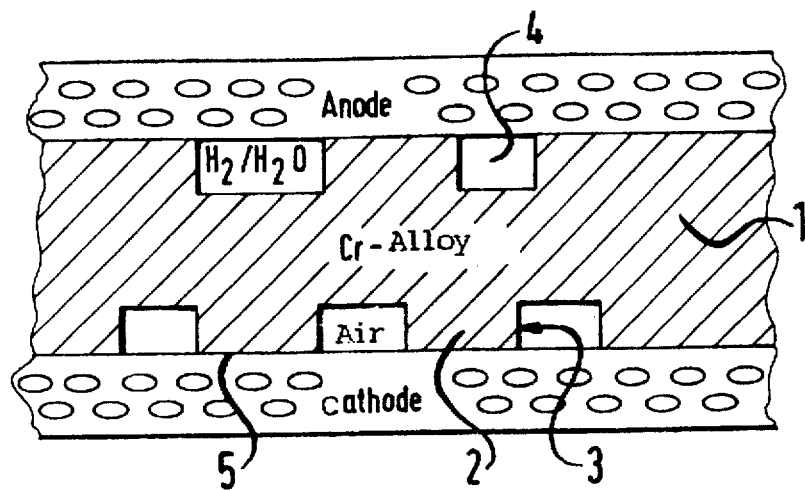
FIG. 1 is a section through a bipolar plate arranged between an anode and a cathode.
Figure 2:
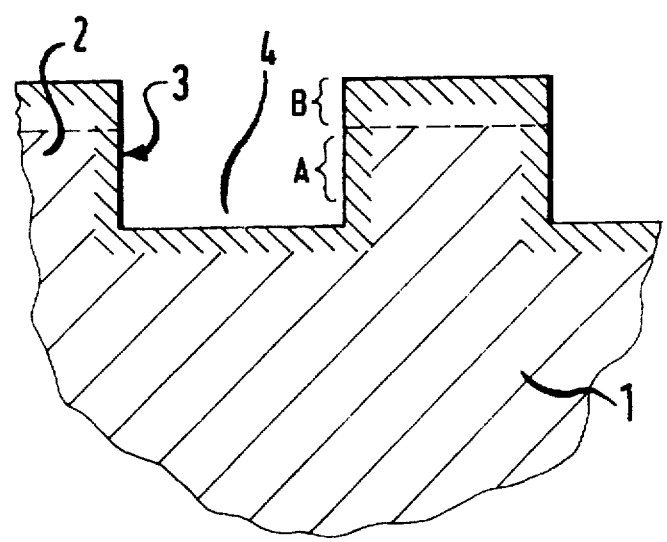
FIG. 2 is a detail section of the bipolar plate shown in FIG. 1 during the fabrication.

FIG. 1 shows the bipolar plate 1 of a chromium-based alloy (e.g. Cr-5Fe-1$Y_2O_3$-composition in weight %) or (for t≦900° C.) of a high chromium-containing iron-based alloy (for example ferritic steel with 20 to 35 weight % chromium). The typical form of the plate which can be several millimeters thick with gas channels can be manufactured by conventional machining of sheet material or it can be fabricated by a process yielding a shape close to the final form (near-net-shape process) by powder metallurgical methods (MIM, WPP). The ribs 2 on the plate, which form the side walls 3 of the gas channels 4, are initially fabricated to be slightly higher than is desired in the final configuration so that the removal of the aluminum-enriched layer on the electrode contact surfaces of the ribs (end faces) is taken into consideration. The bipolar plate fabricated in this way is subjected to a conventional aluminum diffusion process. For this purpose, the plate can be coated with a powder mixture of inert material (e.g. $Al_2O_3$, 90%) a chloride/fluoride activator (e.g. NaCl or $NH_4Cl$, 5%) and aluminum powder (5%) at a elevated temperature (600° to 1300° C.) under a protective gas atmosphere (e.g. argon). A typical aluminizing process is carried out for three hours at 1000° C.

The result is an Al-enriched zone on the surfaces of the plate (end faces of the ribs and walls of the gas channels). When a Cr base alloy is used, for example intermetallic phases of the type $Cr_5Al_5$ or $Cr_4Al_9$ are formed.

For enrichment of the surface with Al, different aluminum diffusion techniques or other methods may be used in case these are desirable for process reasons, for example, CVD or PVD. By a simple large area mechanical machining (e.g. grinding) the Al-enriched layers are removed from the end faces of the ribs. The initial over-dimensioning (A+B) is corrected by grinding off of material of the thickness B in an amount greater than the penetration depth of the aluminum in the aluminum-enriched zone.

In this manner, the end faces 5 of the ribs have the composition of the base material (e.g. chromium-based alloy or FeCr-based alloy) of the bipolar plate in its final contour, while in the "walls" 3, of the gas channels, an Al-rich layer is provided.

Under operating conditions (about 950° C. in air, $O_2$, or $H_2/H_2O$ or in another fuel mixture), the thus fabricated bipolar plate forms a chromia based scale at the surfaces of the ribs (i.e. at the contact areas with the electrodes) whereas an $Al_2O_3$ based oxide scale is formed on the walls of the gas channels.

We claim:

1. A metallic bipolar plate for a high-temperature fuel cell, said plate comprising a metal body having surfaces adapted to contact electrodes of said fuel cell and passages having walls confining gases, including fuel and oxidizing gases, for said fuel cell, said body being composed of a chromium-containing alloy oxidizable at said surfaces to form chromium oxide at interfaces between said bipolar plate and said electrodes, said alloy being enriched with aluminum at least in regions of said walls in direct contact with said gases.

2. A metallic bipolar plate for a high-temperature fuel cell defined in claim 1 wherein said regions of said walls are provided in the form of an aluminum-enriched surface layer having a thickness of 20 to 200 μm.

3. A metallic bipolar plate for a high-temperature fuel cell defined in claim 1 wherein said surface layer has a thickness of 50 to 100 μm.

4. A metallic bipolar plate for a high-temperature fuel cell defined in claim 1 wherein said passages are defined between ribs forming said walls and having surfaces contacting said electrodes at which said chromium oxide forms.

5. A metallic bipolar plate for a high-temperature fuel cell defined in claim 1 wherein said alloy is a chromium nickel or chromium iron alloy.

6. A metallic bipolar plate for a high-temperature fuel cell defined in claim 1 wherein said alloy is Cr-5Fe-1$Y_2O_3$ or ferrite steel containing 25 to 30% by weight chromium.

7. A process for producing a metal body having surfaces adapted to contact electrodes of said fuel cell and passages having walls confining gases, including fuel and oxidizing gases, for said fuel cell, said body being composed of a chromium-containing alloy oxidizable at said surfaces to form chromium oxide at interfaces between said bipolar plate and said electrodes, said alloy being enriched with aluminum at least in regions of said walls in direct contact with said gases, said process comprising the steps of:

a) fabricating said body from said chromium-containing alloy;

b) enriching at least a portion of said body in said regions with aluminum in the form of a surface layer; and c) removing at least part of said surface layer at locations of said body adapted to contact said electrodes.

8. A process for producing a metal body as defined in claim 7 wherein said surface layer is enriched by aluminizing.

9. A process for producing a metal body as defined in claim 8 wherein said passages are defined by ribs initially having heights greater than the height of the ribs of the finished plate and ground down to the height of the ribs of the finished plate.

10. A high temperature fuel cell comprising a metallic bipolar plate having opposite surfaces, respective electrodes in contact with said surface, an electrolyte in contact with each of said electrodes, and means forming passages in said plate for fuel and oxidizing gases, said passages having walls confining said gases, said body being composed of a chromium-containing alloy oxidizable at said surfaces to form chromium oxide at interfaces between said bipolar plate and said electrodes, said alloy being enriched with aluminum at least in regions of said walls in direct contact with said gases.

* * * * *